(12) United States Patent  (10) Patent No.: US 7,495,797 B2
Okamoto  (45) Date of Patent: Feb. 24, 2009

(54) COLOR CONVERSION DEFINITION COUPLING APPARATUS, AND COLOR CONVERSION DEFINITION COUPLING PROGRAM STORAGE MEDIUM

(75) Inventor: Takahiro Okamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 914 days.

(21) Appl. No.: 10/815,680

(22) Filed: Apr. 2, 2004

(65) Prior Publication Data

US 2004/0233464 A1 Nov. 25, 2004

(30) Foreign Application Priority Data

May 20, 2003 (JP) ............................. 2003-142198

(51) Int. Cl.
*G06F 15/00* (2006.01)
(52) U.S. Cl. ..................... 358/1.9; 382/167; 345/589
(58) Field of Classification Search ................. 358/1.9; 382/167; 345/589
See application file for complete search history.

(56) References Cited

U.S. PATENT DOCUMENTS 7,259,888 B2 * 8/2007 Wozniak et al. .............. 358/1.2

2003/0214661 A1 * 11/2003 Kondo .......................... 358/1.9
2004/0160454 A1 * 8/2004 Asano .......................... 345/589

FOREIGN PATENT DOCUMENTS

| JP | 60-105376 A | 6/1985 |
| JP | 61-288662 A | 12/1986 |
| JP | 04-196675 A | 7/1992 |
| JP | 2002-252785 A | 9/2002 |
| JP | 2002-314829 A | 10/2002 |
| JP | 2003-069840 A | 3/2003 |

* cited by examiner

*Primary Examiner*—Houshang Safaipour
*Assistant Examiner*—Michael Burleson
(74) *Attorney, Agent, or Firm*—Sughrue Mion, PLLC

(57) ABSTRACT

A color conversion definition coupling apparatus has a definition coupling section for creating the coupling color conversion definition in the manner as set forth below. When it is decided that two coupling areas are identical, associations defined by the space conversion section for the first color conversion definition, the area conversion section for the first color conversion definition, the area conversion section for the second color conversion definition, and the space conversion section for the second color conversion definition are sequentially coupled. When it is decided that two the coupling areas are not identical, associations defined by the space conversion section for the first color conversion definition and the space conversion section for the second color conversion definition are coupled with one another in accordance with a conversion algorithm for converting coordinates from one to another of two the color reproduction areas.

12 Claims, 12 Drawing Sheets

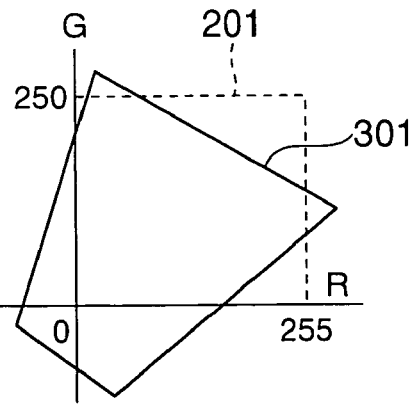
(A) 1st RGB COLOR SPACE
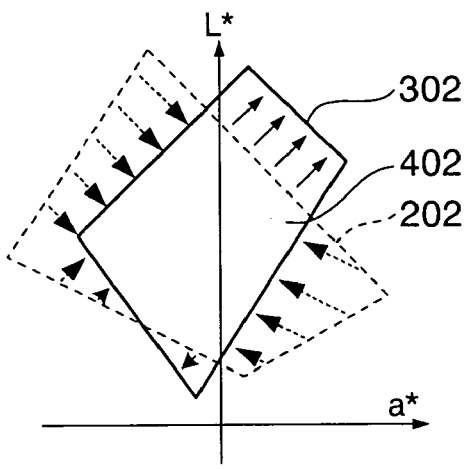
(B) L*a*b* SPACE
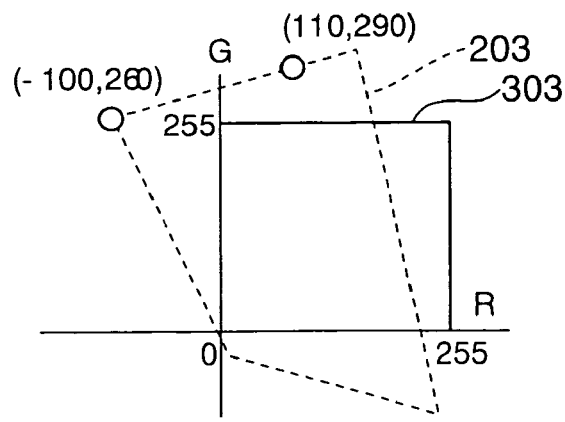
(C) 2nd RGB COLOR SPACE
Fig.8

COLOR CONVERSION DEFINITION COUPLING APPARATUS, AND COLOR CONVERSION DEFINITION COUPLING PROGRAM STORAGE MEDIUM

BACKGROUND OF THE INVENTION

1. Field of the Invention

The present invention relates to a color conversion definition coupling apparatus for creating a coupling color conversion definition defining an association of coordinates of a first device color space depending on a first device with coordinates of a second device color space depending on a second device in such a manner that coordinates of a device color space depending on a device mediating between an image and image data is associated with coordinates of a non-dependence color space independent of a device, and a first color conversion definition and a second color conversion definition, which define the first device and the second device, respectively, are coupled with one another, and a color conversion definition coupling program storage medium storing a color conversion definition coupling program which causes a computer to operate as a color conversion definition coupling apparatus, when the color conversion definition coupling program is incorporated into the computer and is executed.

2. Description of the Related Art

There are known various types of input devices for deriving image data upon receipt of an image, for example, a color scanner for deriving image data upon reading of a recorded image, and a digital still camera (DSC) for deriving image data by means of reading through formation of an image of the subject on a solid state imaging device. According to those input devices, image data is represented by data of a range of for example 0 to 255 on each of three colors for example of R (red), G (green) and B (blue). This range represents a range of colors, which can be dealt with as hardware in the input device. However, there is a limit to colors, which can be represented by numerical values within determined ranges on three colors of R (red), G (green) and B (blue). For this reason, even if a color of the original image involves extremely plentiful expression, once conversion into image data by the input device may restrict the image represented by the image data to colors within the color expression area represented by a cube and a rectangular parallelepiped within R, G, B color spaces, which can be dealt with in the input device.

With respect to an output device for outputting an image in accordance with image data, there are known various types of output devices, for example, a photographic printer for recording an image on a photographic paper in such a manner that the photographic paper is exposed with a laser light and the exposed photographic paper is developed, a printer for recording an image on a paper in accordance with an electro-photographic system and an ink jet system, a printing machine for creating a large amount of printed matters through running a rotary press, and an image display unit for displaying an image on a display screen in accordance with image data, for example, a CRT display and a plasma display. Also with respect to those output devices, in a similar fashion to that of the above-mentioned input device, there are color representation areas according to the respective output devices. That is, the output devices can represent various colors in accordance with image data representative of three colors for example, R, G and B, and image data representative of four colors of C (cyan), M (magenta), Y (yellow), and K (black). However, the range of colors, which can be dealt with as hardware in the output device, is restricted to colors within the color representation area (for example, a color representation area represented by numeral values of 0 to 255 on each of three colors of R, G and B) represented by a cube and a rectangular parallelepiped of output device color spaces (for example, RGB color spaces, and CMYK color spaces). The color representation areas in the input device and the output device are referred to as a color gamut.

By the way, recently, it is increased that image data is used on a common basis among various sorts of input devices and various sorts of output devices, and there is known a method in which when the input devices and the output devices are connected with one another to apply the image data, colors of image data are kept equal. There is known, for example, a method in which the association between coordinates of a device color space depending on a device and coordinates of a device independent color space (a space of device independent data: for example, L*a*b* color space) independent of a device is defined by an association table referred to as a profile and is prepared for each of sorts of the input devices and the output devices, and a combination profile coupling profiles for devices, in which image data is applied, to one another is used to perform a conversion of image data.

However, an application of image data in the manner of maintaining colors of the image data of equality may bring about an omission of color representation at the portion in which the color representation area is of discordance, since the color representation area is varied for each of the devices as mentioned above. A large omission of the color representation may bring about unnaturalness of the image represented by the applied image data.

On the other hand, it is empirically known that regardless of discordance of the color representation area, various types of devices can represent the essentially same image in form of visually natural images. The natural images represented by the various types of devices are represented with colors, which are somewhat different from one another in accordance with a difference between the color representation areas of the devices. However, images represented by any of the devices may give the natural impression, because adaptability of person's eyes is high.

Thus, when image data is applied, there is needed a color conversion to convert colors of images to maintain the natural impression for the images. It is desired for such a color conversion that the respective colors in the color representation areas (color gamut) of a certain device are completely associated with the respective colors in the color representation areas (color gamut) of another device. Such a color conversion is referred to as a gamut mapping.

Hitherto, as the color conversion (gamut mapping), there are proposed various methods of performing the gamut mapping on the independent color space (for example, Japanese Patent Application Laid Open Gazette TokuKai Sho. 60-105376, Japanese Patent Application Laid Open Gazette TokuKai Sho. 61-288662, and Japanese Patent Application Laid Open Gazette TokuKai Hei. 4-196675)

Further, according to ICC (International Color Consortium), there is proposed a format in which a conversion definition section defining on a non-dependence color space coordinate conversion between a color reproduction area depending on a device and a coupling area (Profile Connection Space: PCS) independent of a device is incorporating into the above-mentioned profile. Conversion of image data using the coupled profile coupling this format of profiles with one another makes it possible to implement the gamut mapping.

However, according to the technology proposed by the ICC, since no strict definition for the coupling area exists, there is a high possibility that a plurality of sorts of profiles supposing different coupling areas exists. In the event that mutually different sorts of profiles are coupled with one another in accordance with the conventional scheme, the difference between the coupling areas would cause inconvenience in the gamut mapping.

SUMMARY OF THE INVENTION

In view of the foregoing, it is an object of the present invention to provide a color conversion definition coupling apparatus and a color conversion definition coupling program storage medium storing a color conversion definition coupling program, which are capable of suitably coupling color conversion definitions with one another even if a plurality of sorts of profiles (color conversion definitions) supposing different coupling areas exists.

To achieve the above-mentioned object, the present invention provides a color conversion definition coupling apparatus for creating a coupling color conversion definition defining an association of coordinates of a first device color space depending on a first device with coordinates of a second device color space depending on a second device in such a manner that coordinates of a device color space depending on a device mediating between an image and image data is associated with coordinates of a non-dependence color space independent of a device, and a first color conversion definition and a second color conversion definition, which define the first device and the second device, respectively, are coupled with one another, wherein each of the first color conversion definition and the second color conversion definition has a space conversion section defining an association between the coordinates of the device color space on a color reproduction area representative of colors capable of being reproduced by the device and the coordinates of the non-dependence color space, and an area conversion section defining on the non-dependence color space an association between coordinates of the color reproduction area and coordinates of a coupling area independent of the device, and wherein the conversion definition coupling apparatus comprises:

an area decision section that decides whether two the coupling areas for the first color conversion definition and the second color conversion definition are identical; and a definition coupling section that creates the coupling color conversion definition in such a manner that when the area decision section decides that two the coupling areas are identical, associations defined by the space conversion section for the first color conversion definition, the area conversion section for the first color conversion definition, the area conversion section for the second color conversion definition, and the space conversion section for the second color conversion definition are sequentially coupled, and when the area decision section decides that two the coupling areas are not identical, associations defined by the space conversion section for the first color conversion definition and the space conversion section for the second color conversion definition are coupled with one another in accordance with a conversion algorithm for converting coordinates from one to another of two the color reproduction areas.

To achieve the above-mentioned object, the present invention provides a color conversion definition coupling program storage medium storing a color conversion definition coupling program which causes a computer to operate as a color conversion definition coupling apparatus, when the color conversion definition coupling program is incorporated into the computer and is executed, the color conversion definition coupling apparatus that creates a coupling color conversion definition defining an association of coordinates of a first device color space depending on a first device with coordinates of a second device color space depending on a second device in such a manner that coordinates of a device color space depending on a device mediating between an image and image data is associated with coordinates of a non-dependence color space independent of a device, and a first color conversion definition and a second color conversion definition, which define the first device and the second device, respectively, are coupled with one another, wherein each of the first color conversion definition and the second color conversion definition has a space conversion section defining an association between the coordinates of the device color space on a color reproduction area representative of colors capable of being reproduced by the device and the coordinates of the non-dependence color space, and an area conversion section defining on the non-dependence color space an association between coordinates of the color reproduction area and coordinates of a coupling area independent of the device, and wherein the conversion definition coupling apparatus comprises:

an area decision section that decides whether two the coupling areas for the first color conversion definition and the second color conversion definition are identical; and a definition coupling section that creates the coupling color conversion definition in such a manner that when the area decision section decides that two the coupling areas are identical, associations defined by the space conversion section for the first color conversion definition, the area conversion section for the first color conversion definition, the area conversion section for the second color conversion definition, and the space conversion section for the second color conversion definition are sequentially coupled, and when the area decision section decides that two the coupling areas are not identical, associations defined by the space conversion section for the first color conversion definition and the space conversion section for the second color conversion definition are coupled with one another in accordance with a conversion algorithm for converting coordinates from one to another of two the color reproduction areas.

It is acceptable that the area decision section referred to in the present invention decides differences between the two coupling areas through comparison of the vertexes of the two coupling areas, or alternatively decides differences between two coupling areas taking into consideration of differences of tools and makers for two color conversion definitions.

According to the present invention, in the event that the two coupling areas are identical, the two color conversion definitions are simply coupled with one another, and a gamut mapping is utilized via the coupling area. In the event that the two coupling areas are not identical, a predetermined algorithm is used to do over again the gamut mapping. Thus, it is possible to obtain advantages of the gamut mapping via the coupling area, and in addition to avoid the inconvenience of the gamut mapping due to the difference between the coupling areas. Accordingly, it is possible to suitably couple color conversion definitions with one another even if a plurality of sorts of profiles (color conversion definitions) supposing different coupling areas exists.

While the similar names are applied to the structural elements in the color conversion definition coupling apparatus and the color conversion definition coupling program storage medium, those structural elements mean the hardware and the software in the color conversion definition coupling apparatus, and mean only the software in the color conversion definition coupling program storage medium.

With respect to the structural elements such as the area decision section constituting the color conversion definition coupling program related to the present invention, it is acceptable that function of one structural element is implemented by one program part, function of one structural element is implemented by a plurality of program parts, or alternatively functions of a plurality structural elements are implemented by one program part. Further, it is acceptable that those structural elements are executed by oneself or by instruction to another program or program parts incorporated into a computer.

BRIEF DESCRIPTION OF THE DRAWINGS

FIG. 8 is a typical illustration of color reproduction areas of a color scanner and a color printer.

DETAILED DESCRIPTION OF PREFERRED EMBODIMENTS

Embodiments of the present invention will be described with reference to the accompanying drawings.

Figure 1:
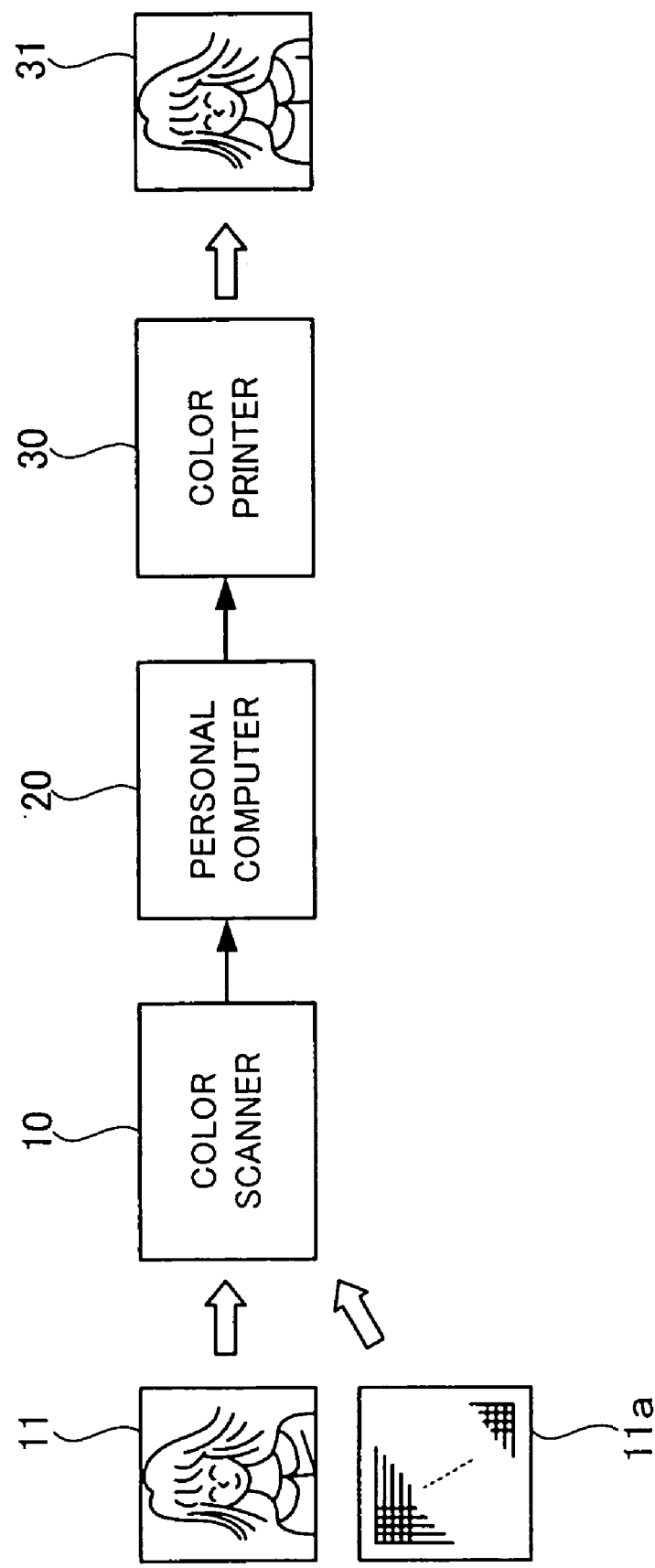
FIG. 1 is a construction view of an image input-color conversion-image output system to which an embodiment of the present invention is applied.

FIG. 1 is a construction view of an image input-color conversion-image output system to which an embodiment of the present invention is applied.

A color scanner 10 reads an original image 11 recorded on a color reversal film and creates image data for RGB three colors. The image data for RGB three colors is fed to a personal computer 20. In the personal computer 20, the image data, which is obtained by the color scanner 10, is converted into image data for RGB three colors for an image output suitable for a color printer 30 (which will be described later). The image data for the image output thus obtained through the conversion is fed to the color printer 30. The color printer 30 performs a printing output in accordance with the entered image data to form a printed image 31.

The personal computer 20 creates a color conversion definition beforehand. When the image data obtained by the color scanner 10 is converted into the image data for the color printer 30, the derived color conversion definition is referred to. There will be described later the color conversion definition and a method of creation of the color conversion definition. To create the color conversion definition, the color scanner 10 reads color chart 11a wherein a large number of color patches, which is recorded on a color reversal film, is arranged.

According to the system shown in FIG. 1, there is shown the color printer 30 by way of example of an output device for outputting an image based on image data. It is acceptable, however, that the color printer 30 is an electrophotographic system of color printer, an ink jet system of color printer, or a printer having a system in which a photographic paper is exposed with modulated laser beam and the photographic paper is developed. In effect, any printing system is acceptable. Further, as the output device, it is not restricted to a printer, and any one is acceptable, as the output device, which is concerned with for example, a printing machine or an image display unit such as a CRT display unit for displaying an image on a display screen and a plasma display unit.

An aspect of the embodiment of the present invention in the system shown in FIG. 1 resides in processing contents which will be executed in the personal computer 20. Hereinafter, there will be explained the personal computer 20.

Figure 2:
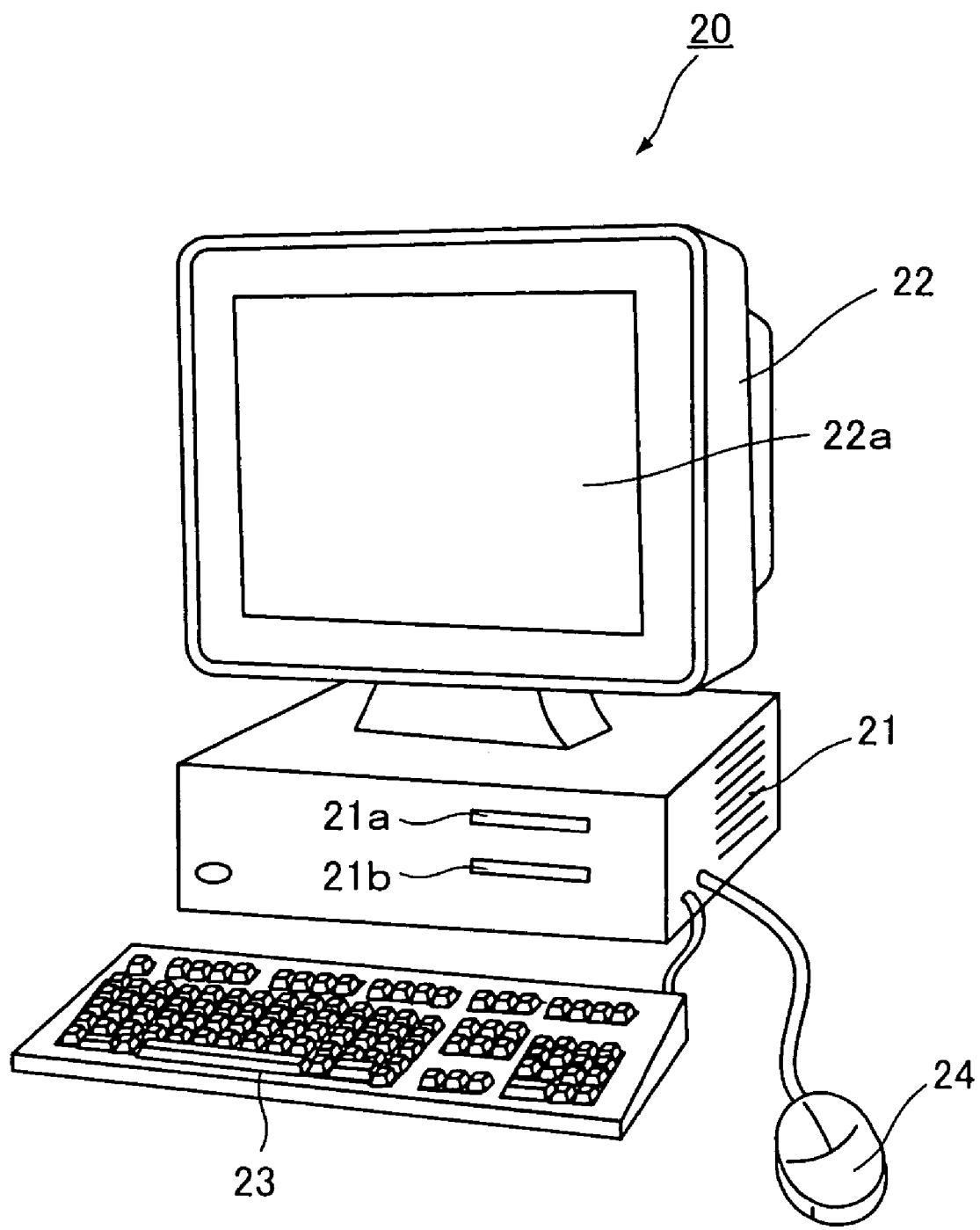
FIG. 2 is a perspective view of a personal computer shown in FIG. 1.
Figure 3:
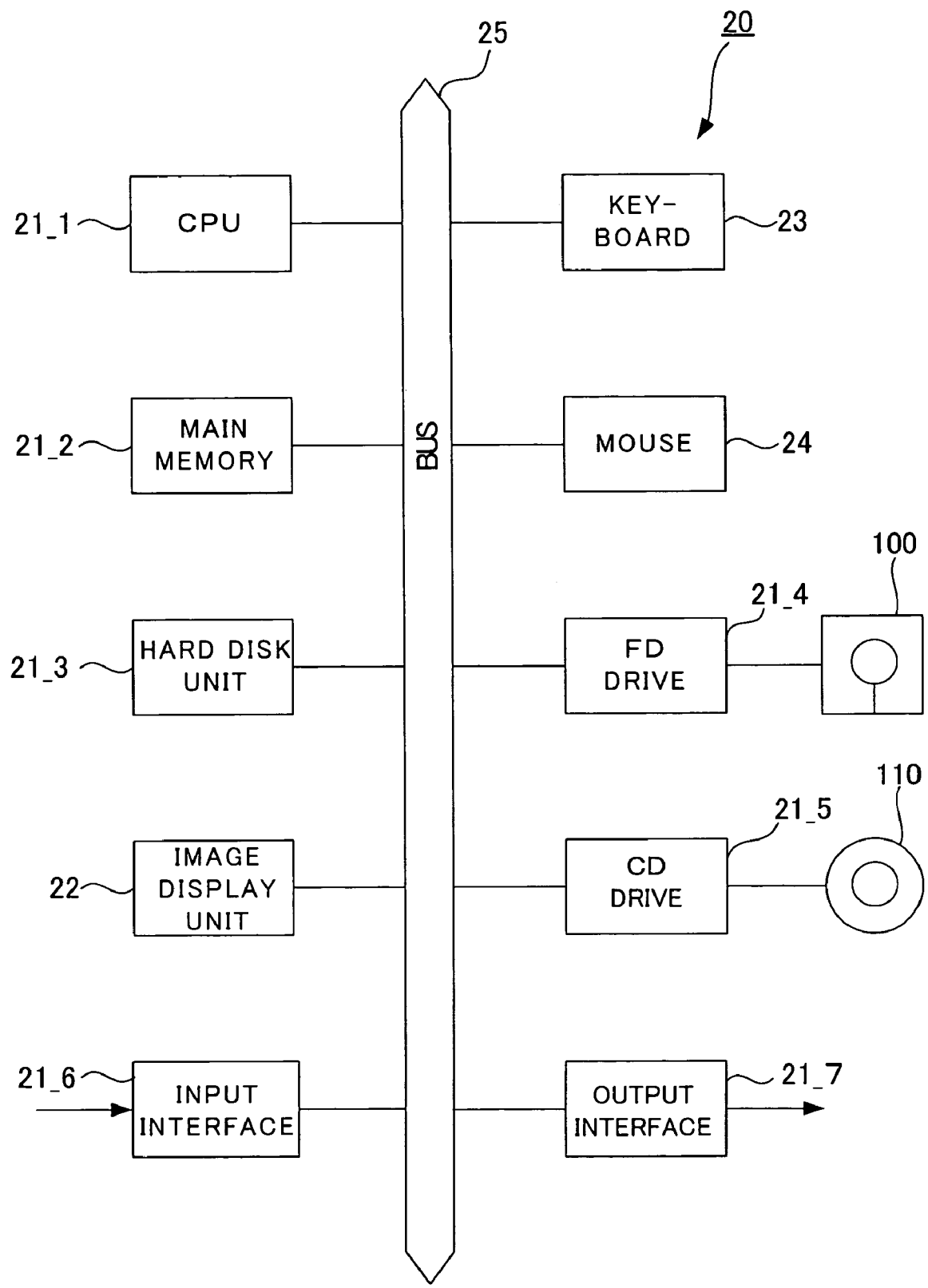
FIG. 3 is a hardware structural view of the personal computer.

FIG. 2 is a perspective view of a personal computer shown in FIG. 1. FIG. 3 is a hardware structural view of the personal computer 20.

The personal computer 20 comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a flexible disk mounting slot 21a for mounting a flexible disk, and a CD-ROM mounting slot 21b for mounting a CD-ROM.

The main frame unit 21 comprises, as shown in FIG. 3, a CPU 21_1 for executing a various types of program, a main memory 21_2 in which a program stored in a hard disk unit 21_3 is read out and developed for execution by the CPU 21_1, the hard disk unit 21_3 for saving various types of programs and data, a flexible disk drive 21_4 for accessing a flexible disk 100 mounted thereon, a CD-ROM drive 21_5 for accessing a CD-ROM 110 mounted thereon, an input interface 21_6 connected to the color scanner 10 of FIG. 1 to receive image data from the color scanner 10, and output interface 21_7 connected to the color printers 30 in FIG. 1 to transmit image data to the printer 30. These various types of elements are connected via a bus 25 to the image display unit 22, the keyboard 23 and the mouse 24.

According to the present embodiment, the personal computer 20 has a function of a color conversion definition creating apparatus for creating a color conversion definition. Hereinafter, first, there will be described a technology of the conventional method of creating a color conversion definition.

Figure 4:
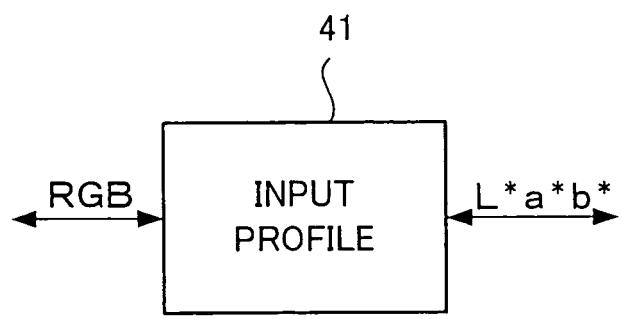
FIG. 4 is a conceptual view of an input profile.

FIG. 4 is a conceptual view of an input profile.

When the input profile is available from a maker of the color scanner 10, there is no need to create the input profile. Here, there will be briefly explained an outline of a creating method of the input profile.

There is prepared a color patch image 11a consisting of a large number of color patches instead of an original image 11 shown in FIG. 1. The color scanner 10 reads the color patch image 11a to generate color data on an input RGB space (an example of the first device color space referred to in the present invention) for each of the color patches. And a colorimeter is used to measure the color patch image so as to generate color data representative of coordinate points on a L*a*b* space (an example of the non-dependence color space referred to in the present invention), for each of the color patches.

Association between the coordinate points on the input RGB space and the coordinate points on the L*a*b* space in form of LUT (Look Up Table) makes it possible to obtain an input profile 41. The input profile 41 is varied in accordance with a sort of the color scanner 10 and a sort of an input device, and depends on the input device.

Figure 5:
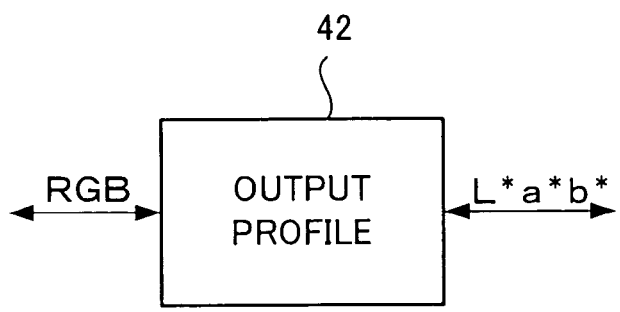
FIG. 5 is a conceptual view of an output profile.

FIG. 5 is a conceptual view of an output profile.

It happens that the output profile associated with a color printer is provided from a maker of the color printer. And thus in the event that the output profile associated with a color printer of interest is available, there is no need to create the output profile. Here, however, there will be explained an outline of a creating method of the output profile.

The personal computer 20 shown in FIG. 1 is used to generate, as image data for RGB three colors, image data in which values for R, G and B are sequentially varied. The color printer 30 prints out a color patch image in accordance with the thus generated image data. While the printed image 31 shown in FIG. 1 is not an image representative of a color patch image, a calorimeter measures color patches constituting the color patch image, assuming that the color printer 30 prints out the color patch image instead of the printed image 31. This feature makes it possible to obtain coordinate values on an output RGB space (an example of another of the second device color space referred to in the present invention) and coordinate values on a L*a*b* color space, so that the association between those coordinate values in form of the LUT may construct an output profile 42.

The output profile 42 is varied in accordance with output devices, that is, depends on the output devices.

Figure 6:
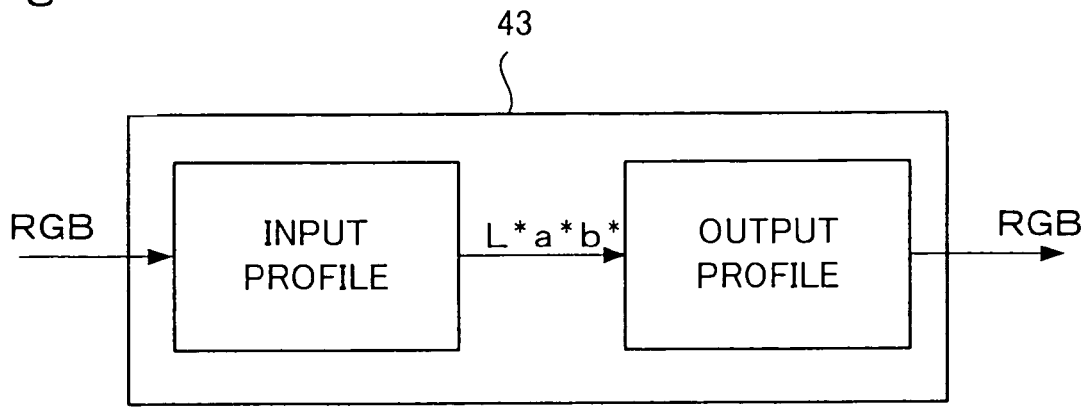
FIG. 6 is a conceptual view useful for understanding a coupled profile coupling an input profile with an output profile.

FIG. 6 is a conceptual view useful for understanding a coupled profile coupling an input profile with an output profile.

Coupling of the input profile 41 with the output profile 42, which are explained referring to FIG. 4 and FIG. 5, makes it possible to obtain a coupled profile 43 for converting image data for RGB obtained by the color scanner into image data for RGB for the color printer. According to the coupled profile 43, it is possible to obtain through conversion by once the same result as such a series of processing that the input profile 41 is used to convert the image data for RGB obtained by the color scanner into image data on the L*a*b* color space, and the output profile 42 is used to convert the image data on the L*a*b* color space into the image data for RGB for the color printer.

Figure 7:
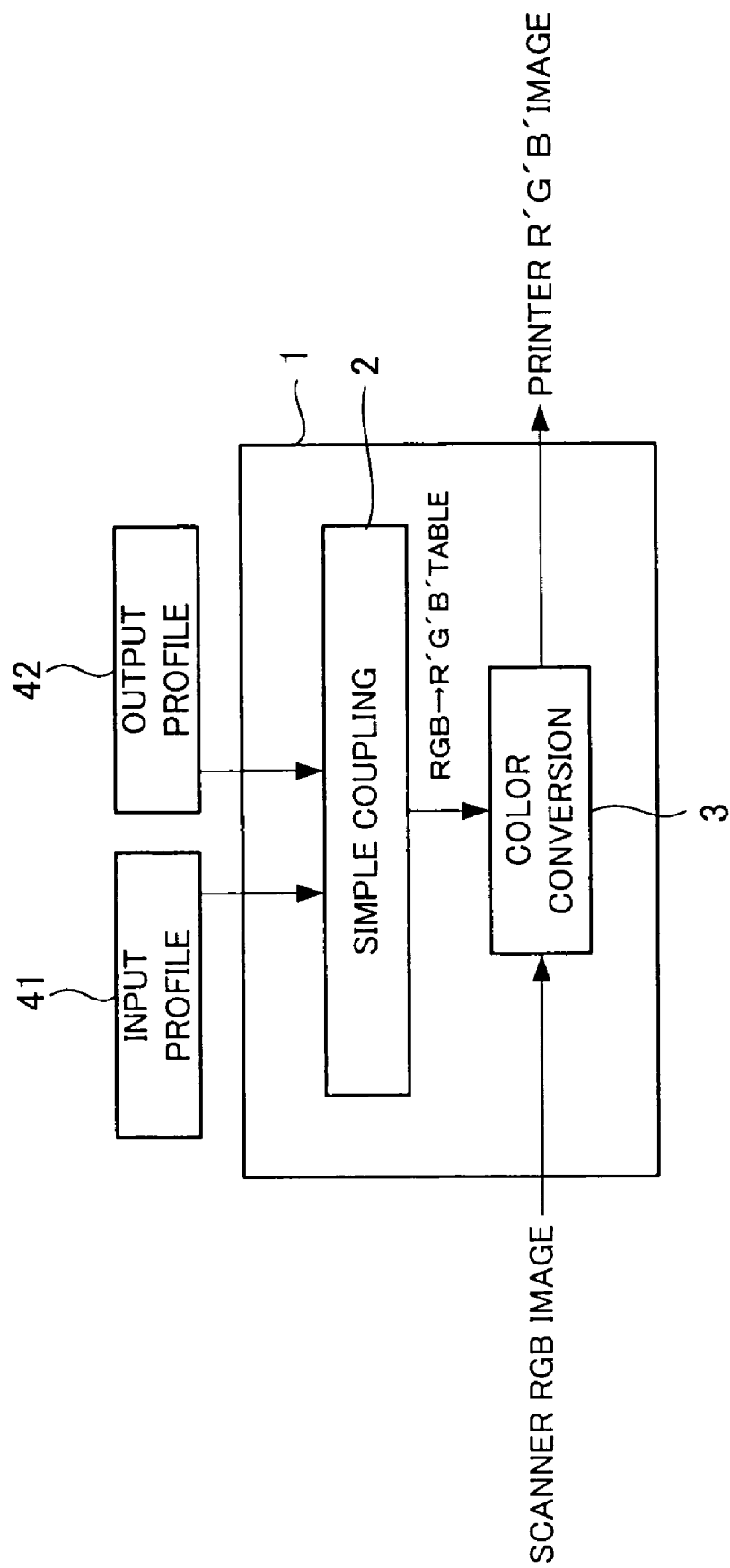
FIG. 7 is a view showing a color conversion apparatus for performing coupling of profiles and color conversion supposing the profiles shown in FIG. 4 to FIG. 6.

FIG. 7 is a view showing a color conversion apparatus for performing coupling of profiles and color conversion supposing the profiles shown in FIG. 4 to FIG. 6.

According to a color conversion apparatus 1 shown in FIG. 7, a simple coupling section 2 couples the input profile 41 with the output profile 42, which are explained referring to FIG. 4 and FIG. 5, and creates the coupled profile 43, which is explained referring to FIG. 6. Further, according to the color conversion apparatus 1, a color conversion section 3 uses the coupled profile 43 to convert the image data (RGB data) obtained by the color scanner into the image data (R'G'B' data) for a color printer. The image data of RGB thus obtained is fed to the color printer 30 shown in FIG. 1, so that the color printer 30 can obtain the printed image 31 in which the color representation for the original image 11 is reproduced.

However, in case of the simple color conversion as mentioned above, as will be described hereinafter, there is a problem that the color reproduction area (color gamut) of the color scanner 10 does not discord with the reproduction area (color gamut) of the color printer 30.

FIG. 8 is a typical illustration of color reproduction areas of the color scanner 10 and the color printer 30.

A part (A) of FIG. 8 shows an input RGB space that is a color space of the input side, where for the purpose of a simplification an R-G plane is shown. In a similar fashion to that of the part (A) of FIG. 8, a part (B) of FIG. 8 shows an L*-a* plane of an L*a*b* space that is one of the non-dependence color space independent of a device, and a part (C) of FIG. 8 shows an R-G plane of an output RGB space that is a color space of the output side.

The color scanner 10 converts the original image 11 into image data representative of numerical values of 0 to 255 on each of R, G and B, where the rectangular area (actually, a cubic area) shown in the part (A) of FIG. 8 is a color reproduction area 201 of the color scanner 10.

Now, when the input profile 41, which is explained referring to FIG. 4, is used to map the color reproduction area 201 of the color scanner 10 as shown in the part (A) of FIG. 8 to the L*a*b* space, the color reproduction area 201 of the color scanner 10 is represented by a color reproduction area 202. When the output profile 42, which is explained referring to FIG. 5, is used to map the color reproduction area 202 to the output RGB space that is a color space of the output side, the color reproduction area 202 of the color scanner 10 is represented by a color reproduction area 203, as shown in the part (C) of FIG. 8.

On the other hand, a color reproduction area 303 of the color printer 30 shown in FIG. 1 is a cubic area (a rectangular area on the R-G plane in the part (C) of FIG. 8) represented by a range of numerical values 0 to 255 on each of R, G and B on the output RGB space in the part (C) of FIG. 8. In the event that the original image 11 is read by the color scanner 10 and is converted into image data on the input RGB space, and the image data thus converted is converted into image data on the output RGB space via the L*a*b* space, it happens that the image data is converted into values which exceed colors (a range of 0 to 255 on each of R, G and B on the image data) capable of being represented by the color printer 30, for example, (R, G)=(110, 290), or (R, G)=(−100, 260), as exemplarily shown in the part (C) of FIG. 8. In this case, the color printer 30 cannot output those image data, that is, the image data out of the color reproduction area of the color printer 30.

On the other hand, when the color reproduction area 303 of the color printer 30, that is, the rectangular area on the R-G plane in the part (C) of FIG. 8 represented by a range of numerical values 0 to 255, is mapped to the L*a*b* space using the output profile, it is represented by a color reproduction area 302 shown in the part (B) of FIG. 8. When the color reproduction area 302 of the color printer 30 mapped to the L*a*b* space in the part (B) of FIG. 8 is further mapped to the input RGB space in part (A) of FIG. 8, it is represented by an area 301 which has a portion going out of the color reproduction area 201 of the color scanner 10. In other words, the color printer 30 has ability capable of outputting colors, which the color scanner 10 cannot read.

As mentioned above, hitherto, there are proposed technologies of converting data of the color reproduction area 202 of the color scanner 10 (input device) into data of the color reproduction area 302 of the color printer 30 (output device) in the non-dependence color space represented by the L*a*b* space. According to the color conversion (mapping) in the L*a*b* space, when it is intended to broadly utilize the color reproduction area which is capable of being represented by the color printer 30, generally, there are performed both a "compression", as shown with arrows of the broken lines in the part (B) of FIG. 8, in which data out of a common area 402 of the color reproduction area 201 of the color scanner 10 and the color reproduction area 302 of the color printer 30 is mapped to the inside of the common area 402, and an "expansion", as shown with arrows of the solid lines in the part (B) of FIG. 8, in which data inside the common area 402 is expanded to the outside of the common area 402 maintaining the condition that it is inside the color reproduction area 302 of the color printer 30.

By the way, in order to convert data of the color reproduction area 202 of the color scanner 10 (input device) into data of the color reproduction area 302 of the color printer 30 (output device), it is general that a LUT for the gamut mapping is prepared beforehand and individual data is converted at high speed using the LUT. However, since it is impossible to create the LUT unless a combination of two devices (here the input device and the output device) between which data is converted is decided, as in the input profile 41 and the output profile 42 explained referring to FIG. 4 and FIG. 5, it is difficult that the makes of the devices create the LUT beforehand. For this reason, the above-mentioned ICC proposes a system that a coupling area (PCS) independent of a device is set up on the non-dependence color space represented by the L*a*b* space, and two mappings between the color reproduction area of the respective device and the coupling area are performed. According to this proposal, there is used a profile having a LUT defining a mapping between the color reproduction area of the respective device and the coupling area, instead of the input profile 41 and the output profile 42 explained referring to FIG. 4 and FIG. 5, respectively.

Figure 9:
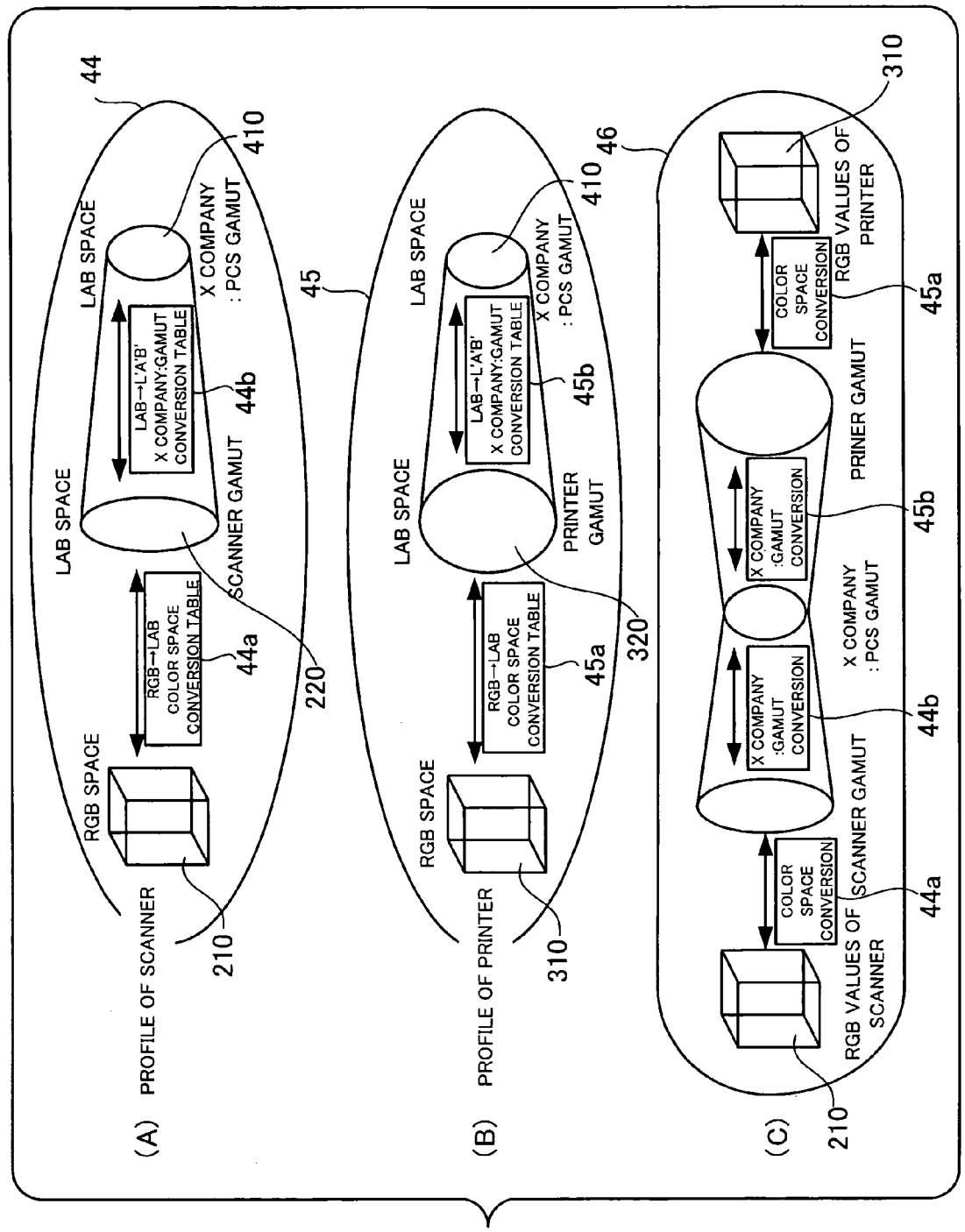
FIG. 9 is a view showing profiles including a mapping between a color reproduction area of a device and a coupling area.

FIG. 9 is a view showing profiles including a mapping between a color reproduction area of a device and a coupling area.

A part (A) of FIG. 9 shows a structure of an input profile 44 by which the input profile 41 shown in FIG. 4 is replaced. A part (B) of FIG. 9 shows a structure of an output profile 45 by which the output profile 42 shown in FIG. 5 is replaced. A part (C) of FIG. 9 shows a structure of a coupled profile 46 by which the coupled profile 43 shown in FIG. 6 is replaced. Here, it is assumed that the input profile 44 and the output profile 45 are produced by a maker addressed as X company, and information indicative of the product maker is appended to the input profile 44 and the output profile 45.

The new input profile 44 shown in the part (A) of FIG. 9 is a profile for a scanner, and comprises a color space conversion table 44a defining coordinates conversion between a RGB space 210 depending on a scanner and a color reproduction area 220 for a scanner on the L*a*b* space, and an area conversion table 44b defining a mapping between the color reproduction area 220 for a scanner and a coupling area 410. The color space conversion table 44a corresponds to an example of the space conversion section referred to in the present invention. The area conversion table 44b corresponds to an example of the area conversion section referred to in the present invention.

The new output profile 45 shown in the part (B) of FIG. 9 is a profile for a printer, and comprises a color space conversion table 45a defining coordinates conversion between a RGB space 310 depending on a printer and a color reproduction area 320 for a printer on the L*a*b* space, and an area conversion table 45b defining a mapping between the color reproduction area 320 for a printer and a coupling area 410. The color space conversion table 45a corresponds to an example of the space conversion section referred to in the present invention. The area conversion table 45b corresponds to an example of the area conversion section referred to in the present invention.

Since the input profile 44 and the output profile 45 have the common coupling area 410, as shown in the part (C) of FIG. 9, the color space conversion table 44a and the area conversion table 44b of the input profile 44 and the area conversion table 45b and the color space conversion table 45a of the output profile 45 are sequentially coupled. Thus, it is possible to construct the coupled profile 46, which completely associates coordinates of the RGB space 210 depending on a scanner and coordinates of the RGB space 310 depending on a printer.

In this manner, in the event that the makers of the profiles are the same, simply coupling two profiles 44 and 45 makes it possible to readily obtain a coupled profile with great accuracy taking the gamut mapping into consideration too.

However, in the event that the profiles to be coupled are produced by the different makers, there is a problem that accuracy of the coupled profile is lowered.

Figure 10:
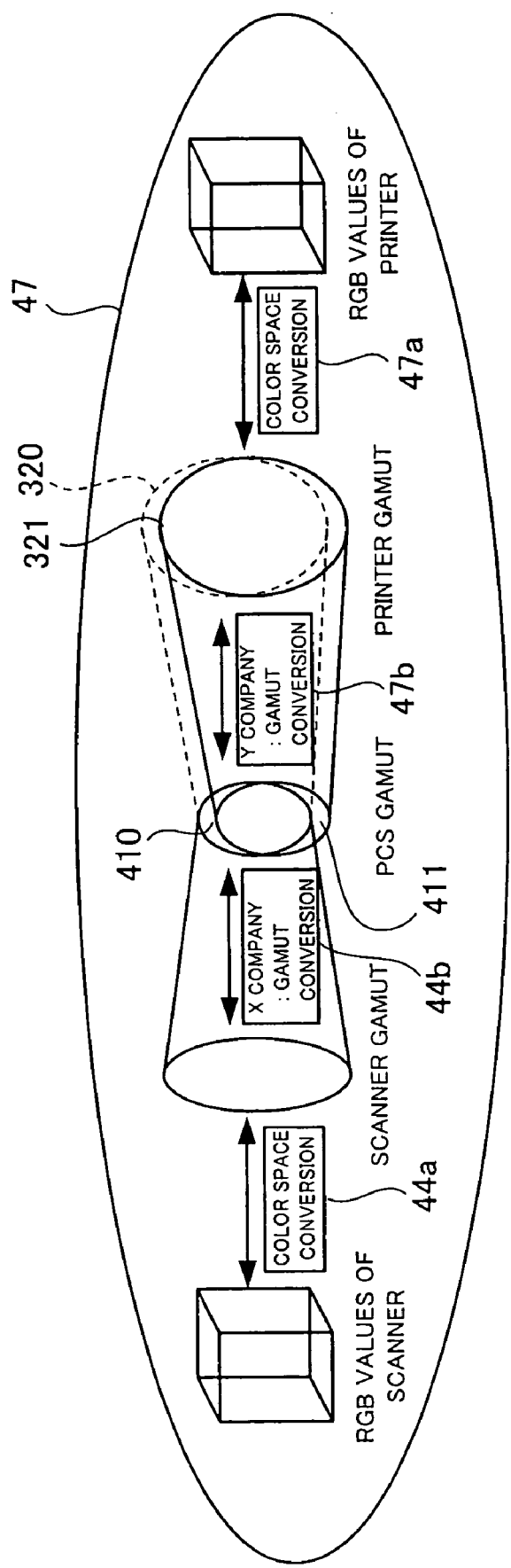
FIG. 10 is a view of a coupled profile coupling profiles of different makers.

FIG. 10 is a view of a coupled profile in which profiles of different makers are coupled with one another.

FIG. 10 shows a coupled profile 47 created in accordance with the similar way as mentioned above, wherein the output profile 45 of X company make as shown in FIG. 9 is replaced by an output profile of Y company make. The color space conversion table 45a and the area conversion table 45b of X company make and the area conversion table 47b and the color space conversion table 47a of Y company make are sequentially coupled to construct the coupled profile 47.

The coupling area 410, which is set up at the time of a creation of the profile by X company, is different from a coupling area 411, which is set up at the time of a creation of the profile by Y company. This difference causes coordinates to be mapped in only an area in which a color reproduction area 321 for a printer is overlapped with a color reproduction area 320 that is displaced from the color reproduction area 321, so that distortions of the mapping would occur.

According to the present embodiment, as will be explained hereinafter, inconvenience caused by the difference between the coupling areas is avoided, and advantages of the profiles having the structures as shown in FIG. 9 are also applied.

Figure 11:
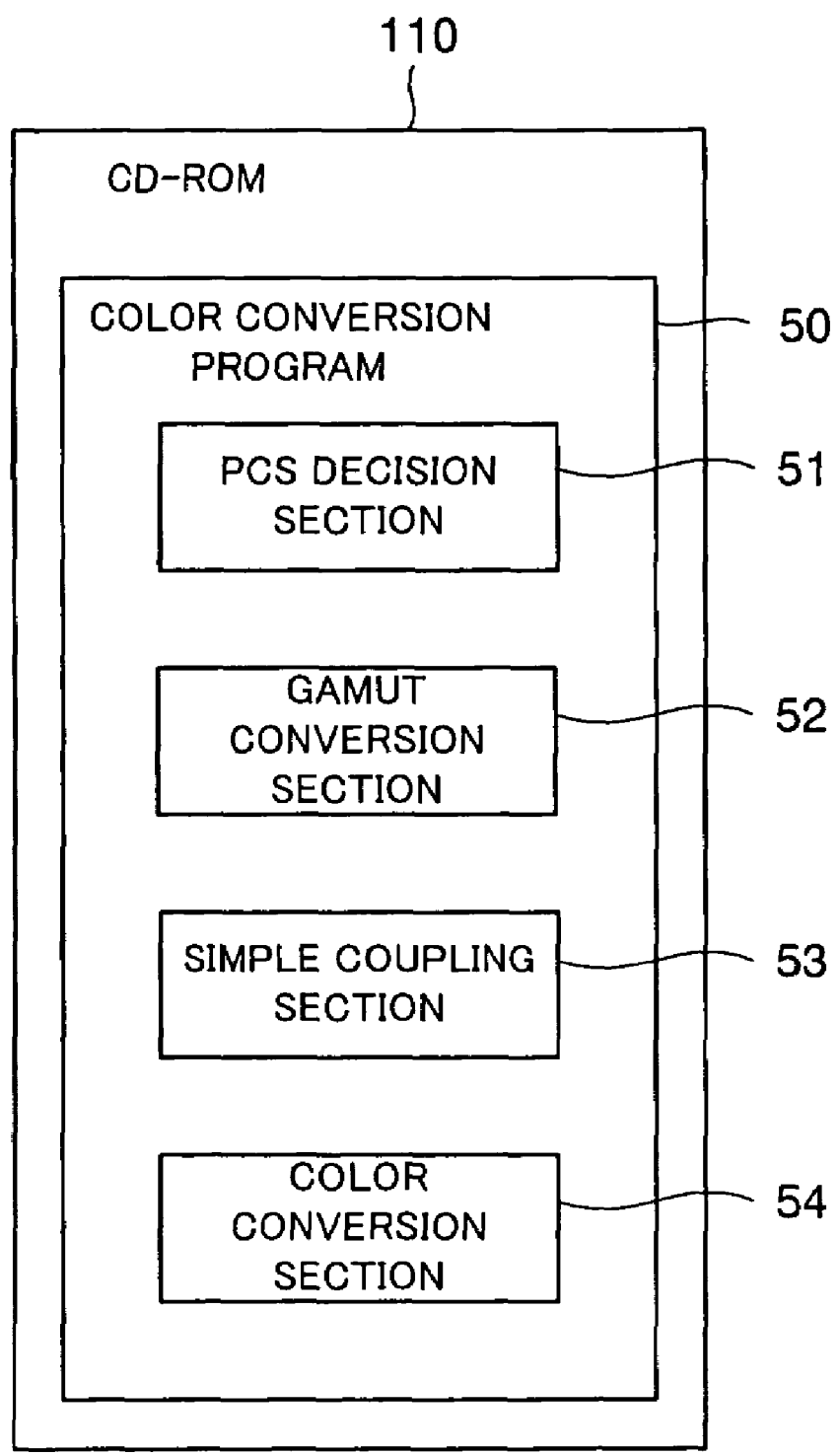
FIG. 11 is a view useful for understanding a color conversion definition coupling program storage medium storing a color conversion definition coupling program according to an embodiment of the present invention.

FIG. 11 is a view useful for understanding a color conversion definition coupling program storage medium storing a color conversion definition coupling program according to an embodiment of the present invention.

A color conversion program 50, as shown in FIG. 11, performs not only coupling of color conversion definitions, but also a color conversion using the coupled color conversion definition. The color conversion program 50 is stored in the CD-ROM 110.

The color conversion program 50 is executed by the personal computer 100 shown in FIG. 1, and causes the personal computer 100 to operate as a color conversion definition coupling apparatus for coupling two color conversion definitions with one another, and as a color conversion apparatus for performing a color conversion. The color conversion program 50 comprises a PCS decision section 51, a gamut conversion section 52, a simple coupling section 53 and a color conversion section 54.

The PCS decision section 51 corresponds to an example of the area decision section of a color conversion definition coupling program stored in a color conversion definition coupling program storage medium of the present invention. The gamut conversion section 52 and the simple coupling section 53 constitute an example of the definition coupling section of a color conversion definition coupling program stored in a color conversion definition coupling program storage medium of the present invention. The color conversion section 54 is not always a necessary structural element of the present invention.

Functions of the respective elements of the color conversion program 50 will be described later.

Figure 12:
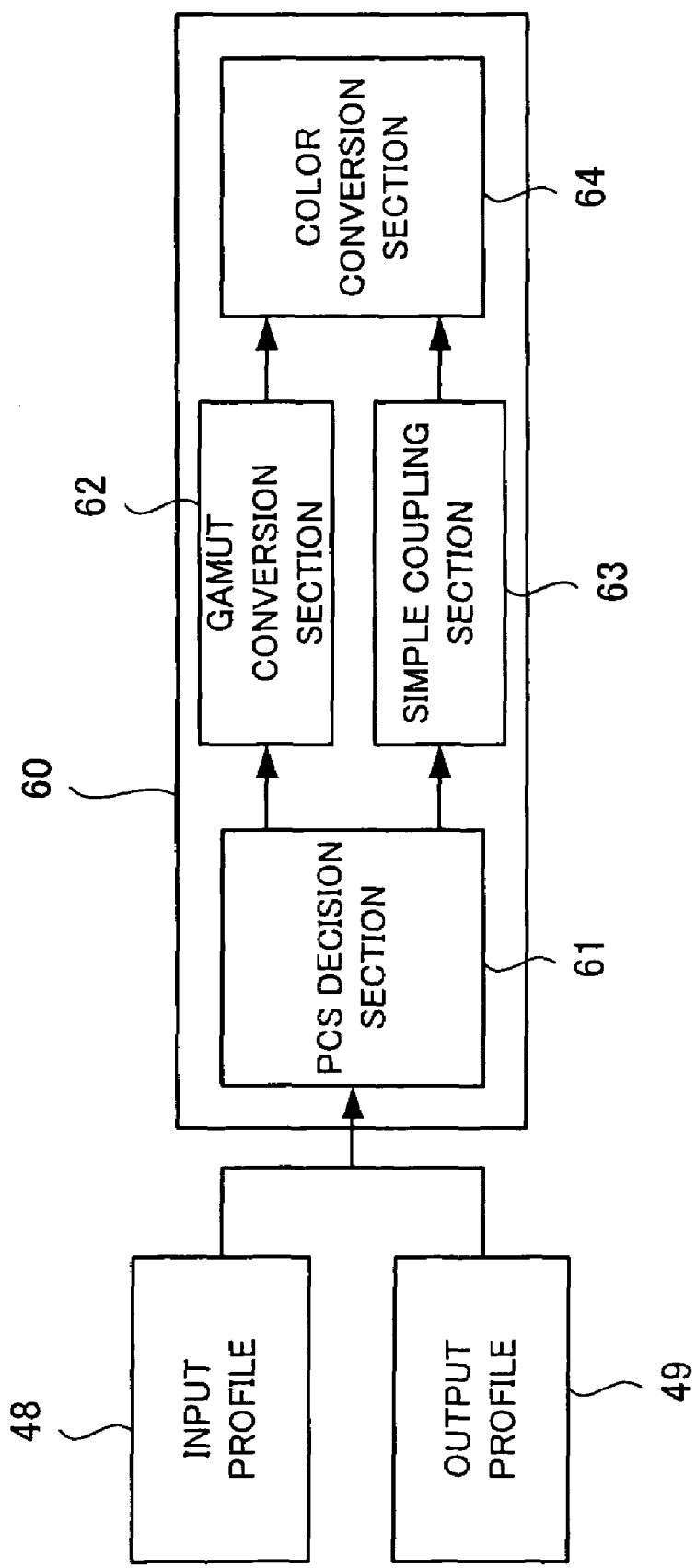
FIG. 12 is a functional block diagram of a color conversion definition coupling apparatus according to an embodiment of the present invention.

FIG. 12 is a functional block diagram of a color conversion definition coupling apparatus according to an embodiment of the present invention.

A color conversion apparatus 60, as shown in FIG. 12, which is an embodiment of the color conversion definition coupling apparatus of the present invention, performs not only coupling of color conversion definitions, but also a color conversion using the thus coupled color conversion definition. The color conversion apparatus 60 is implemented when the color conversion program 50 shown in FIG. 11 is installed in the personal computer 20 shown in FIG. 1 and is executed.

The color conversion apparatus 60 comprises a PCS decision section 61, a gamut conversion section 62, a simple coupling section 63 and a color conversion section 64. The PCS decision section 61, the gamut conversion section 62, the simple coupling section 63 and the color conversion section 64 correspond to the PCS decision section 51, the gamut conversion section 52, the simple coupling section 53 and the color conversion section 54, respectively, which constitute the color conversion program 50 shown in FIG. 11. However, while the respective elements of the color conversion apparatus 60 shown in FIG. 12 are constructed by a combination of the hardware of the personal computer 20 shown in FIG. 1 and the OS and the application program executed by the personal computer 20, the respective elements of the color conversion program 50 shown in FIG. 11 is constructed by only the application program.

The PCS decision section 61 corresponds to an example of the area decision section of a color conversion definition coupling apparatus of the present invention. The gamut conversion section 62 and the simple coupling section 63 constitute an example of the definition coupling section of a color conversion definition coupling apparatus of the present invention. The color conversion section 64 is not always a necessary structural element of the present invention.

Hereinafter, there will be explained the respective elements of the color conversion apparatus 60 shown in FIG. 12, and the respective elements of the color conversion program 50 shown in FIG. 11 as well.

Here, it is assumed that the objects to be coupled with one another are an input profile 48 and an output profile 49, which are produced by arbitrary makers.

The PCS decision section 61, which constitutes the color conversion apparatus 60 shown in FIG. 12, decides whether the coupling areas for the input profile 48 and the output profile 49 are identical. According to the present embodiment, makers of the input profile 48 and the output profile 49 are simply compared with one another. In the event that the makers are identical, it is decided that the coupling areas for the input profile 48 and the output profile 49 are the same areas as one another. In the event that the makers are different, it is decided that the coupling areas are also different. It is possible to decide whether the coupling areas for two profiles are identical in accordance with a method in which data of the coupling area side of a boundary conversion table is searched to directly grasp coupling areas, so that the coupling areas are compared with one another. However, since such a method is associated with a problem that the arithmetic operation for the decision is a great burden, it is preferable to adopt a decision by means of comparison of makers.

In the event that the PCS decision section 61 decides that the coupling areas for the input profile 48 and the output profile 49 are identical, the two profiles 48 and 49 are transmitted to the simple coupling section 63 so as to be coupled with one another as shown in the part (C) of FIG. 9 to create a coupled profile.

On the other hand, in the event that the PCS decision section 61 decides that the coupling areas for the input profile 48 and the output profile 49 are different from one another, the two profiles 48 and 49 are transmitted to the gamut conversion section 62. The gamut conversion section 62 extracts color space conversion tables from the two profiles 48 and 49, respectively to be coupled with one another.

Figure 13:
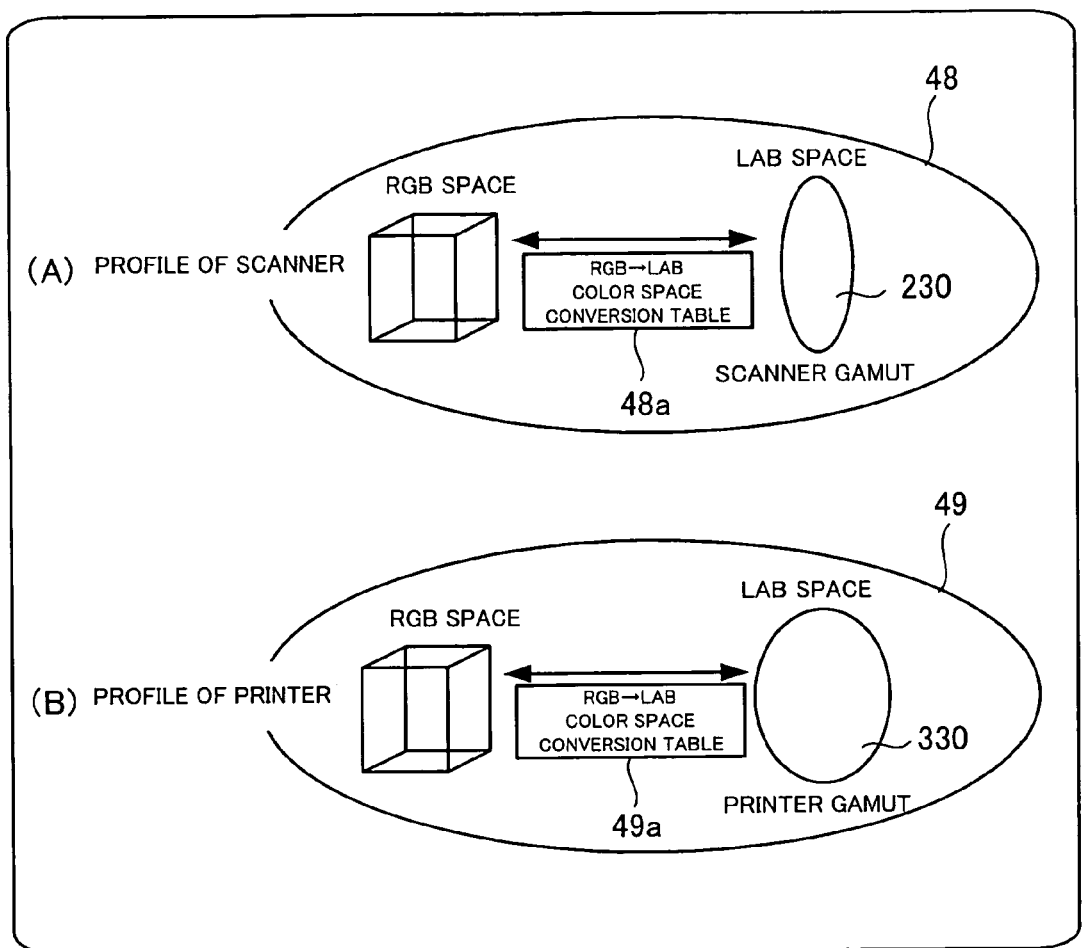
FIG. 13 is a view showing color space conversion tables extracted by a gamut conversion section.

FIG. 13 is a view showing color space conversion tables extracted by the gamut conversion section.

A part (A) of FIG. 13 shows a color space conversion table 48a extracted from an input profile 48 for a scanner. A part (B) of FIG. 13 shows a color space conversion table 49a extracted from an output profile 49 for a printer. Those color space conversion tables 48a and 49a are created in accordance with the common creating method but not by any makers of profiles, in a similar fashion to that of the input profile 41 and the output profile 42 explained referring to FIG. 4 and FIG. 5. Analysis of data of the output side of the color space conversion tables 48a and 49a makes it possible to obtain a color reproduction area 230 for a scanner and a color reproduction area 330 for a printer.

The gamut conversion section 62 shown in FIG. 12 couples the color space conversion tables 48a and 49a with one another via mapping between the color reproduction area 230 and the color reproduction area 330.

Figure 14:
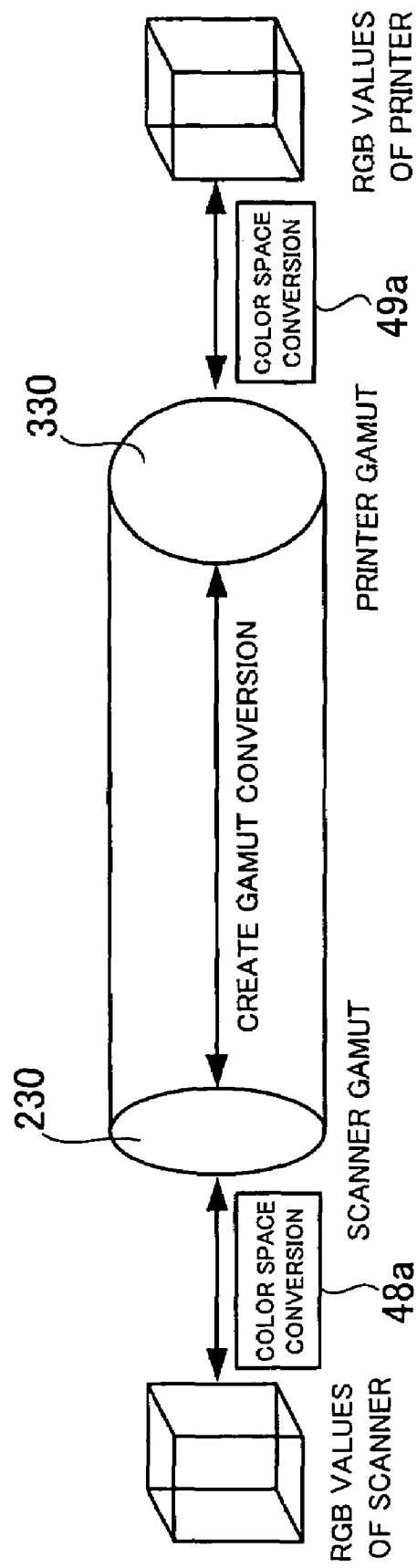
FIG. 14 is a view useful for understanding coupling of the color space conversion tables extracted by a gamut conversion section.

FIG. 14 is a view useful for understanding coupling of the color space conversion tables extracted by a gamut conversion section.

The gamut conversion section 62 shown in FIG. 12 creates a conversion table representative of mapping between the color reproduction area 230 for a scanner and the color reproduction area 330 for a printer using a technique disclosed in for example Japanese Patent Application Laid Open Gazette TokuKai 2001-103329, and couples the color space conversion table 48a extracted from the input profile 48 for a scanner with the color space conversion table 49a extracted from the output profile 49 for a printer via the conversion table thus created. Thus, it is possible to obtain the coupled profile completely associating the RGB space for a scanner with the RGB space for a printer.

The coupled profile obtained by the gamut conversion section 62 and the coupled profile obtained by the simple coupling section 63, as shown in FIG. 12, are transmitted to the color conversion section 64, so that those coupled profiles are used to perform a color conversion for image data. Therefore, according to the present embodiment, in the event that the coupling areas are the same as one another in the two profiles 48 and 49 to be coupled, the respective area conversion tables for the profiles 48 and 49 are applied to simply obtain a coupled profile with great accuracy, and the color conversion is executed. In the event that the coupling areas are different from one another in the two profiles 48 and 49 to be coupled, a coupled profile with great accuracy, in which inconvenience due to the difference between the coupling areas is avoided, is obtained, and the color conversion is executed.

According to the present embodiment, by way of the example of the device color space referred to in the present invention, there is shown the RGB space. However, according to the present invention, it is acceptable that the device color space referred to in the present invention is a CMY space, or alternatively a CMYK space.

Further, according to the present embodiment, by way of the example of the non-dependence color space referred to in the present invention, there is shown the L*a*b* color space. However, according to the present invention, it is acceptable that the non-dependence color space referred to in the present invention is a XYZ space, or alternatively a sRGB color space.

According to the present embodiment, there is disclosed an example in which an input profile is coupled with an output profile. However, according to the present embodiment, it is acceptable that input profiles are coupled with one another, or alternatively output profiles are coupled with one another.

Further, according to the present embodiment, there is disclosed an example in which there is provided a function of performing a color conversion using a coupled profile. However, according to the present invention, it is acceptable that a color conversion definition coupling apparatus of the present invention and a color conversion definition coupling program stored in a color conversion definition coupling program storage medium of the present invention are a color conversion definition coupling apparatus and a color conversion definition coupling program which have no function of the color conversion.

Furthermore, according to the present embodiment, by way of the example of the storage medium for storing a color conversion definition coupling program, there is shown the CD-ROM. According to the present invention, any one is acceptable, as the storage medium for storing a color conversion definition coupling program related to the present invention, which can store the program. As the storage medium, for example, there are raised a magnetic disk of a hard disk unit, a flexible disk, an MO disk, a DVD, card type or tape type of storage medium.

As mentioned above, according to a color conversion definition coupling apparatus of the present invention and a color conversion definition coupling program stored in a color conversion definition coupling program storage medium of the present invention, it is possible to suitably couple color conversion definitions with one another even if a plurality of sorts of profiles (color conversion definitions) supposing different coupling areas exists.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion definition coupling apparatus for creating a coupling color conversion definition defining an association of coordinates of a first device color space depending on a first device with coordinates of a second device color space depending on a second device in such a manner that coordinates of a device color space depending on a device mediating between an image and image data is associated with coordinates of a non-dependence color space independent of a device, and a first color conversion definition and a second color conversion definition, which define the first device and the second device, respectively, are coupled with one another, wherein each of the first color conversion definition and the second color conversion definition has a space conversion section defining an association between the coordinates of the device color space on a color reproduction area representative of colors capable of being reproduced by the device and the coordinates of the non-dependence color space, and an area conversion section defining on the non-dependence color space an association between coordinates of the color reproduction area and coordinates of a coupling area independent of the device, and wherein the conversion definition coupling apparatus comprises:

an area decision section that decides whether the two coupling areas for the first color conversion definition and the second color conversion definition are identical; and a definition coupling section that creates the coupling color conversion definition in such a manner that when the area decision section decides that the two coupling areas are identical, associations defined by the space conversion section for the first color conversion definition, the area conversion section for the first color conversion definition, the area conversion section for the second color conversion definition, and the space conversion section for the second color conversion definition are sequentially coupled, and when the area decision section decides that the two coupling areas are not identical, associations defined by the space conversion section for the first color conversion definition and the space conversion section for the second color conversion definition are coupled with one another in accordance with a conversion algorithm for converting coordinates from one to another of the two color reproduction areas.

2. The color conversion definition coupling apparatus of claim 1, wherein the area decision section decides whether the two coupling areas for the first color conversion definition and the second color conversion definition are identical by comparing makers of the first color conversion definition and the second color conversion definition, wherein if both a first maker of the first color conversion definition and a second maker of the second color conversion definition are identical, the area decision section decides that the two coupling areas are identical, and if the first maker and the second maker are not identical, the area decision section decides that the two coupling areas are not identical.

3. The color conversion definition coupling apparatus of claim 1, wherein the area decision section decides whether the two coupling areas for the first color conversion definition and the second color conversion definition are identical by retrieving data of a coupling area side of a boundary conversion table of the two coupling areas to directly grasp the coupling areas, and comparing the two coupling areas based on the retrieved data.

4. The color conversion profile coupling apparatus of claim 1, wherein the second circuit determines whether the first coupling area and the second coupling area are identical by comparing a first maker of the first color conversion profile and a second maker of the second color conversion profile, and if both the first maker and the second maker are identical, the second circuit determines that the first coupling area and the second coupling area are identical, and if the first maker and the second maker are not identical, the second circuit determines that the first coupling area and the second coupling area are not identical.

5. A color conversion definition coupling program storage medium storing a color conversion definition coupling program which causes a computer to operate as a color conversion definition coupling apparatus, when the color conversion definition coupling program is incorporated into the computer and is executed, the color conversion definition-coupling apparatus that creates a coupling color conversion definition defining an association of coordinates of a first device color space depending on a first device with coordinates of a second device color space depending on a second device in such a manner that coordinates of a device color space depending on a device mediating between an image and image data is associated with coordinates of a non-dependence color space independent of a device, and a first color conversion definition and a second color conversion definition, which define the first device and the second device, respectively, are coupled with one another, wherein each of the first color conversion definition and the second color conversion definition has a space conversion section defining an association between the coordinates of the device color space on a color reproduction area representative of colors capable of being reproduced by the device and the coordinates of the non-dependence color space, and an area conversion section defining on the non-dependence color space an association between coordinates of the color reproduction area and coordinates of a coupling area independent of the device, and wherein the conversion definition coupling apparatus comprises:

an area decision section that decides whether the two coupling areas for the first color conversion definition and the second color conversion definition are identical; and a definition coupling section that creates the coupling color conversion definition in such a manner that when the area decision section decides that the two coupling areas are identical, associations defined by the space conversion section for the first color conversion definition, the area conversion section for the first color conversion definition, the area conversion section for the second color conversion definition, and the space conversion section for the second color conversion definition are sequentially coupled, and when the area decision section decides that the two coupling areas are not identical, associations defined by the space conversion section for the first color conversion definition and the space conversion section for the second color conversion definition are coupled with one another in accordance with a conversion algorithm for converting coordinates from one to another of the two color reproduction areas.

6. The color conversion definition coupling program storage medium of claim 5, wherein the area decision section decides whether the two coupling areas for the first color conversion definition and the second color conversion definition are identical by comparing makers of the first color conversion definition and the second color conversion definition, wherein if both a first maker of the first color conversion definition and a second maker of the second color conversion definition are identical, the area decision section decides that the two coupling areas are identical, and if the first maker and the second maker are not identical, the area decision section decides that the two coupling areas are not identical.

7. The color conversion definition coupling program storage medium of claim 5, wherein the area decision section decides whether the two coupling areas for the first color conversion definition and the second color conversion definition are identical by retrieving data of a coupling area side of a boundary conversion table of the two coupling areas to directly grasp the coupling areas, and comparing the two coupling areas based on the retrieved data.

8. A color conversion profile coupling apparatus comprising:

a first circuit that receives a first color conversion profile comprising a first space conversion section that associates coordinates of a first device color space capable of being reproduced by a first device with coordinates of a first non-dependence color space independent of the first device, and a first area conversion section that associates, on the first non-dependence color space, the coordinates of the first non-dependence color space with coordinates of a first coupling area independent of the first device, and a second color conversion profile comprising a second space conversion section that associates coordinates of a second device color space capable of being reproduced by a second device with coordinates of a second non-dependence color space independent of the second device, and a second area conversion section that associates, on the second non-dependence color space, the coordinates of the second non-dependence color space with coordinates of a second coupling area independent of the second device;

a second circuit that determines whether the first coupling area and the second coupling area are identical, and creates a coupling profile that associates the first color conversion profile and the second color conversion profile in a fist configuration if the first coupling area and the second coupling area are identical, and creates the coupling profile in a second configuration different from the first configuration if the first coupling area and the second coupling area are not identical.

9. The color conversion profile coupling apparatus of claim 8, wherein the first configuration comprises a sequential coupling of the coordinates of the first device color space, the coordinates of the first non-dependence color space, the coordinates of the first coupling area, the coordinates of the second coupling area, the coordinates of the second non-dependence color space, and the coordinates of the second device color space, and the second configuration comprises a coupling of the coordinates of the first device color space, the coordinates of the first non-dependence color space, the coordinates of the second non-dependence color space, and the coordinates of the second device color space, wherein in the second configuration, the coordinates of the first non-dependence color space and the coordinates of the second non-dependence color space are coupled in accordance with a conversion table that maps the coordinates of the first non-dependence color space and the coordinates of the second non-dependence color space.

10. A color conversion profile coupling program storage medium storing a color conversion profile coupling program which causes a computer to operate as a color conversion profile coupling apparatus, when the color conversion profile coupling program is incorporated into the computer and is executed, the color conversion profile coupling apparatus comprising:

a first module that receives a first color conversion profile comprising a first space conversion section that associates coordinates of a first device color space capable of being reproduced by a first device with coordinates of a first non-dependence color space independent of the first device, and a first area conversion section that associates, on the first non-dependence color space, the coordinates of the first non-dependence color space with coordinates of a first coupling area independent of the first device, and a second color conversion profile comprising a second space conversion section that associates coordinates of a second device color space capable of being reproduced by a second device with coordinates of a second non-dependence color space independent of the second device, and a second area conversion section that associates, on the second non-dependence color space, the coordinates of the second non-dependence color space with coordinates of a second coupling area independent of the second device;

a second module that determines whether the first coupling area and the second coupling area are identical, and creates a coupling profile that associates the first color conversion profile and the second color conversion profile in a fist configuration if the first coupling area and the second coupling area are identical, and creates the coupling profile in a second configuration different from the first configuration if the first coupling area and the second coupling area are not identical.

11. The color conversion profile coupling program storage medium of claim 10, wherein the first configuration comprises a sequential coupling of the coordinates of the first device color space, the coordinates of the first non-dependence color space, the coordinates of the first coupling area, the coordinates of the second coupling area, the coordinates of the second non-dependence color space, and the coordinates of the second device color space, and the second configuration comprises a coupling of the coordinates of the first device color space, the coordinates of the first non-dependence color space, the coordinates of the second non-dependence color space, and the coordinates of the second device color space, wherein in the second configuration, the coordinates of the first non-dependence color space and the coordinates of the second non-dependence color space are coupled in accordance with a conversion table that maps the coordinates of the first non-dependence color space and the coordinates of the second non-dependence color space.

12. The color conversion profile coupling program storage medium of claim 10, wherein the second module determines whether the first coupling area and the second coupling area are identical by comparing a first maker of the first color conversion profile and a second maker of the second color conversion profile, and if both the first maker and the second maker are identical, the second module determines that the first coupling area and the second coupling area are identical, and if the first maker and the second maker are not identical, the second module determines that the first coupling area and the second coupling area are not identical.

* * * * *